US007500556B2

(12) United States Patent
Lemke et al.

(10) Patent No.: US 7,500,556 B2
(45) Date of Patent: Mar. 10, 2009

(54) MAKE-UP BED ASSEMBLY FOR CONVEYOR SYSTEM

(75) Inventors: Donald E Lemke, Sparta, MI (US); Jeffrey D Price, Grand Rapids, MI (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 292 days.

(21) Appl. No.: 11/450,117

(22) Filed: Jun. 9, 2006

(65) Prior Publication Data

US 2006/0289275 A1    Dec. 28, 2006

Related U.S. Application Data

(60) Provisional application No. 60/690,399, filed on Jun. 14, 2005.

(51) Int. Cl.
*B65G 21/00*    (2006.01)
(52) U.S. Cl. .................... 198/861.1; 198/812; 198/588; 198/594
(58) Field of Classification Search .............. 198/861.1, 198/812, 588, 594, 595, 539
See application file for complete search history.

(56) References Cited

U.S. PATENT DOCUMENTS

| | | | |
|---|---|---|---|
| 2,826,290 A | 3/1958 | Barski | |
| 3,374,878 A | 3/1968 | Kornylak | |
| 4,172,677 A | 10/1979 | Gunti | |
| 4,399,908 A | 8/1983 | Gunti | |
| 4,555,010 A | 11/1985 | Solund | |
| 4,640,404 A * | 2/1987 | Bigott | 193/35 TE |
| 5,096,045 A | 3/1992 | Feldl | |
| 5,456,347 A | 10/1995 | Best et al. | |
| 6,003,658 A | 12/1999 | Best et al. | |
| 6,247,581 B1 * | 6/2001 | Oswald et al. | 198/812 |
| 6,367,617 B1 | 4/2002 | Schiesser et al. | |
| 6,510,935 B1 | 1/2003 | McIlvaine | |
| 6,685,008 B2 | 2/2004 | Schiesser et al. | |
| 6,935,487 B2 | 8/2005 | Schaum et al. | |
| 2002/0060139 A1 | 5/2002 | Schiesser et al. | |
| 2003/0029694 A1 * | 2/2003 | Gilmore | 198/313 |
| 2004/0094391 A1 * | 5/2004 | Schaum et al. | 198/812 |
| 2005/0061631 A1 * | 3/2005 | Parks et al. | 198/812 |

FOREIGN PATENT DOCUMENTS

| | | |
|---|---|---|
| DE | 3636857 | 5/1988 |
| JP | 9328217 | 12/1997 |
| WO | WO 2005/105623 | 11/2005 |

* cited by examiner

*Primary Examiner*—Gene Crawford
*Assistant Examiner*—Yolanda Cumbess (57) ABSTRACT

An adjustable conveyor bed that is adjustable in length to span a gap between two devices of a conveyor system includes a primary section and a secondary section that is extendable and retractable relative to the primary section. The primary section has opposite primary sidewalls and a plurality of primary rollers mounted thereto. The primary rollers include a primary motorized roller and a plurality of primary idler rollers interconnected with one another via a plurality of drive members. The secondary section has opposite secondary sidewalls, with the secondary section sidewalls being nestedly received within the primary sidewalls and being adjustably mounted to the primary sidewalls and extendable and retractable relative to the primary sidewalls to adjust a length of the adjustable conveyor bed. The secondary section is configured to support at least one secondary roller when extended a sufficient amount from the primary section.

24 Claims, 7 Drawing Sheets

MAKE-UP BED ASSEMBLY FOR CONVEYOR SYSTEM

CROSS REFERENCE TO RELATED APPLICATION

The present application claims benefit of U.S. provisional application, Ser. No. 60/690,399, filed Jun. 14, 2005, which is hereby incorporated herein by reference in its entirety.

FIELD OF THE INVENTION

The present invention relates generally to conveyors and, more particularly, to roller conveyors having multiple rollers that are rotatably driven via a motorized roller or the like.

BACKGROUND OF THE INVENTION

A roller conveyor system may include multiple zones of rollers, with each zone including multiple rollers. Each zone or set of rollers includes a self-driven or powered or motorized roller that rotatably drives the idler rollers of the respective zone. The driving or motorized roller is operable to rotatably drive the other rollers, such as via O-rings or the like around adjacent rollers. When the driving roller is activated, the rollers function to convey articles along the conveyor zones. The zones are arranged along a conveying path such that articles conveyed along one zone are conveyed onto a next adjacent or downstream zone and so on along the conveying path.

The zones may comprise separate sections having opposite sidewalls to which the respective rollers are mounted. When the conveyor system is designed and installed, the zones or sections are laid out so that the appropriate length zones or sections are positioned to generally abut against the adjacent zones or sections, so as to provide a substantially continuous conveying surface along the conveyor. If a specified zone or section does not fit in a gap between two sections, a new zone must be ordered or made (such as by manufacturing sidewalls of the specified length or cutting down a longer zone to meet the specified length) that will fit within the gap to complete the conveyor system. Thus, it can be very costly and/or labor intensive to adjust a size of a conveyor zone or section during planning and installation of a conveying system.

SUMMARY OF THE INVENTION

The present invention provides a roller conveyor section or zone or bed that is readily adjusted or extended/retracted to provide a desired length of the zone or bed so as to adapt the zone or bed for various length gaps between spaced apart conveyor zones or sections or other devices. The adjustable conveyor bed may be installed at a gap between the spaced apart conveyor zones or sections or devices and may be readily extended to set the length of the conveyor bed to substantially span the gap between the zones or sections or devices.

According to an aspect of the present invention, an adjustable conveyor bed that is adjustable in length to span a particular gap between two devices of a conveyor system includes a primary or parent or first or base section and a secondary or extendable section that is extendable and retractable relative to the primary section. The primary section has opposite primary sidewalls and a plurality of primary rollers mounted thereto, with the primary rollers including a primary motorized roller and a plurality of primary idler rollers interconnected with one another via a plurality of drive members. The secondary section has opposite secondary sidewalls, with the secondary section sidewalls being nestedly received within the primary sidewalls and being adjustably mounted to the primary sidewalls and extendable and retractable relative to the primary sidewalls to adjust a length of the adjustable conveyor bed. The secondary section is configured to support at least one secondary roller when extended a sufficient amount from the primary section. Each of the secondary sidewalls has an elongated roller slot extending at least partially therealong. The roller slot provides clearance of the primary rollers when the secondary section is at least partially retracted. The secondary roller or rollers is/are mounted to mounting plates attached to the secondary sidewalls and spanning the elongated roller slots when the secondary section is extended a sufficient amount. The secondary sidewalls are securable to the primary sidewalls when the secondary section is extended a selected amount from the primary section.

The secondary rollers may include a secondary motorized roller and/or at least one idler roller. The secondary motorized roller may be operable in tandem with the primary motorized roller.

The opposite primary sidewalls may comprise generally C-shaped channels and the opposite secondary sidewalls may comprise generally C-shaped channels. The secondary sidewalls may be nested within the primary sidewalls and slidable relative thereto to adjust the length of the adjustable conveyor bed. The secondary sidewalls may include a plurality of securing slots along a portion thereof, and the primary sidewalls may include a plurality of securing slots along a portion thereof. The secondary sidewalls thus may be securable relative to the primary sidewalls via a plurality of fasteners through the securing slots of the primary and secondary sidewalls.

According to another aspect of the present invention, an adjustable conveyor bed that is adapted to span a gap between two spaced apart devices of a conveyor system includes a primary section having opposite primary sidewalls and a secondary section having opposite secondary sidewalls. The primary section includes a plurality of primary rollers mounted to the primary sidewalls. The primary rollers include a primary motorized roller and a plurality of primary idler rollers interconnected with one another via a plurality of drive members. The secondary section sidewalls are adjustably mounted to the primary sidewalls and are extendable and retractable relative to the primary sidewalls to adjust a length of the adjustable conveyor bed. The secondary section is configured to support at least one secondary roller when extended a sufficient amount from the primary section. The motorized roller is operable at a selected speed, which is dependent on an overall length of the adjustable conveyor bed. The secondary sidewalls are securable to the primary sidewalls when the secondary section is extended a selected amount from the primary section.

According to another aspect of the present invention, an adjustable conveyor bed that is adapted to span a gap between two spaced apart devices of a conveyor system includes a primary section having opposite primary sidewalls and a plurality of primary rollers mounted thereto, and a secondary section having opposite secondary sidewalls, which are adjustably mounted to the primary sidewalls and extendable and retractable relative to the primary sidewalls to adjust a length of the adjustable conveyor bed. The primary rollers include a primary motorized roller and a plurality of primary idler rollers interconnected with one another via a plurality of drive members. The secondary section is configured to support at least one secondary roller when extended a sufficient amount from the primary section. The motorized roller of the adjustable conveyor bed is selectively operable in response to one of a control mounted to the adjustable conveyor bed and a control remote from the adjustable conveyor bed. The control may be selectively positioned at or remote from the adjustable conveyor bed depending on the particular application of the adjustable conveyor bed. The secondary sidewalls are securable to the primary sidewalls when the secondary section is extended a selected amount from the primary section.

Therefore, the present invention provides an extendable or adjustable length conveyor bed that may be positioned between two spaced apart devices or zones or sections of a conveyor system and that may be extended to set the length of the bed to substantially span a gap between the devices or zones or sections. The adjustable conveyor bed thus may be adapted to accommodate tolerance variations in multiple zones of a conveyor system or to accommodate different sized gaps between different devices or zones or sections of a conveyor system. The adjustable conveyor bed may support additional rollers when the bed is extended a sufficient amount such that the primary rollers of the bed and the additional rollers define a substantially continuous conveying surface between the spaced apart devices or zones or sections. Because the adjustable conveyor bed may be extended a desired or appropriate amount, and a desired or appropriate number of rollers may be readily added to provide a substantially continuous conveying surface, the adjustable conveyor bed of the present invention may be readily adapted to various length gaps without significant labor and/or costs that are often associated with modifying standard length roller conveyor beds to span different length gaps.

Additionally, the motorized roller or rollers of the adjustable conveyor bed may be controlled or regulated to drive the rollers at a desired or appropriate speed, which may be dependent on the speed of other zones of the conveyor system and the overall adjusted length of the adjustable conveyor bed. The adjustable length conveyor bed may include an article sensor and the motorized roller may be operable in response to a control that is responsive to a signal from the article sensor. The control may be mounted at the adjustable conveyor bed or may be positioned or located remote from the adjustable conveyor bed depending on whether the adjustable conveyor bed is implemented between two accumulating zones of a conveyor system (whereby the adjustable conveyor bed may be operable in response to a main control of the conveyor system) or between two other types of devices (whereby the adjustable conveyor bed may include a separate control).

These and other objects, advantages, purposes and features of the present invention will become apparent upon review of the following specification in conjunction with the drawings.

DESCRIPTION OF THE PREFERRED EMBODIMENTS

Figure 1:
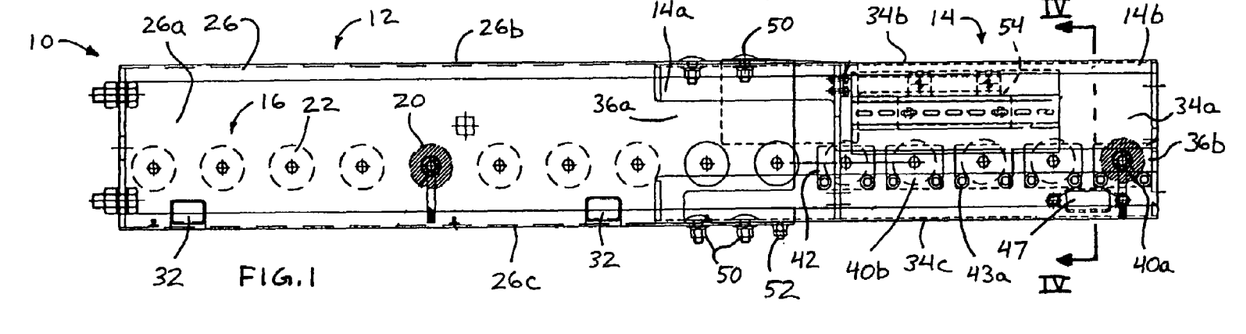
FIG. 1 is a side elevation of an adjustable conveyor zone or bed in accordance with the present invention, showing the bed in a fully extended position.
Figure 2:
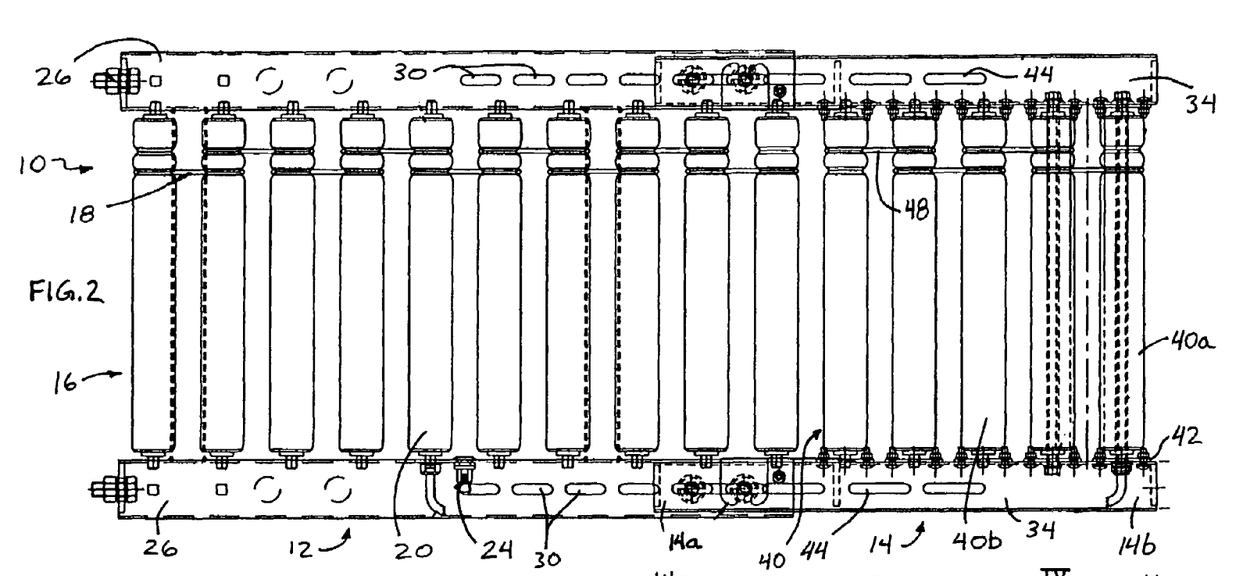
FIG. 2 is a top plan view of the adjustable conveyor bed of FIG. 1.

Referring now specifically to the drawings and the illustrative embodiments depicted therein, an adjustable length or extendable conveyor zone or bed or section 10 of a roller conveyor system includes a first or primary or base section 12 and a second or secondary or movable section 14 that is movable or adjustable or slidable outwardly and inwardly relative to primary section 12 to adjust an overall length of the conveyor zone or bed 10 (FIG. 1).

Primary section 12 of adjustable conveyor bed 10 includes a plurality of rollers 16 and a plurality of drive members 18 (such as O-rings or the like) around adjacent pairs of rollers 16.

The adjustable conveyor bed 10 may be adjustable to adjust the length of the adjustable conveyor bed to accommodate different sized gaps between spaced apart conveyor zones or between other conveyor system devices, such as between two vertical lift units or the like, so that the ends of the adjustable conveyor bed 10 generally abut or are sufficiently close to the other zones or devices to provide a substantially continuous conveying surface between the other zones and/or devices. Adjustable conveyor bed 10 may be independently operable to accumulate articles on the zone or bed or to move articles onto a next, adjacent segment or zone or onto another conveyor, such as another roller conveyor, a belt conveyor, a slider bed, or the like, or any other device or means for receiving articles from a discharge end of the zone or bed.

Rollers 16 of primary section 12 of adjustable conveyor bed 10 include a motorized roller 20 and one or more non-motorized or idler rollers 22. Motorized roller 20 may rotatably drive the idler rollers 22 of the primary section 12 via the drive members or O-rings 18. The motorized roller 20 may be controlled by a control unit or the like, such as in response to one or more article sensors 24 positioned along the conveyor, as discussed below.

Figure 3:
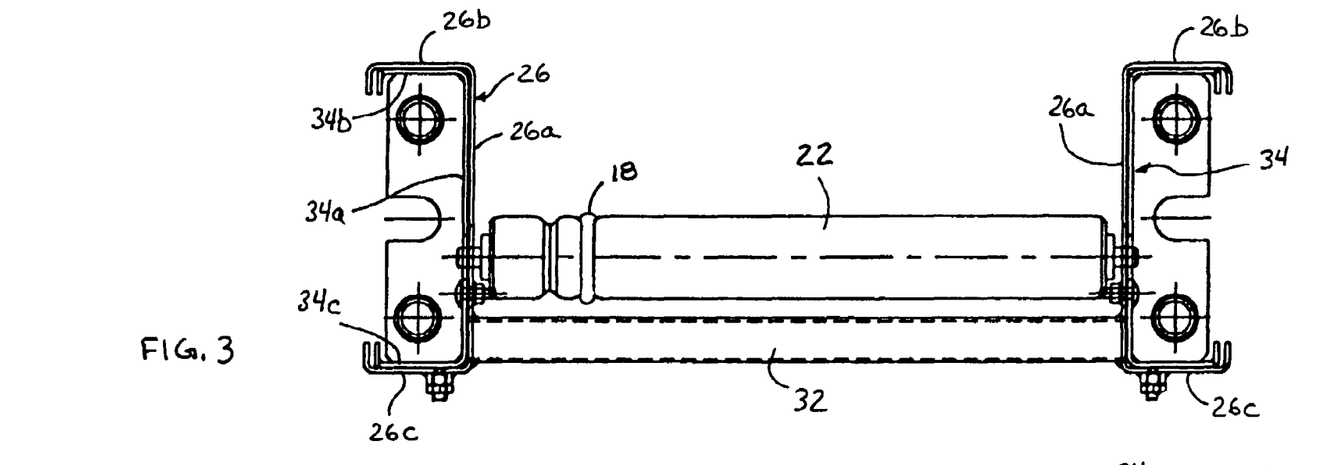
FIG. 3 is an end elevation of the adjustable conveyor bed of FIGS. 1 and 2.
Figure 4:
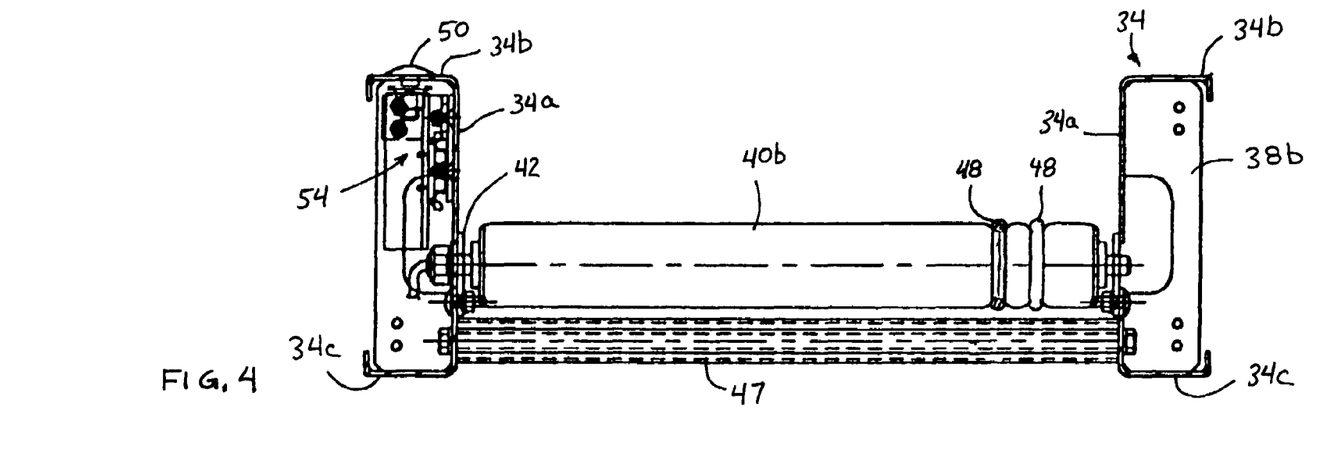
FIG. 4 is a sectional view of the adjustable conveyor bed taken along the line IV-IV in FIG. 1.
Figure 5:
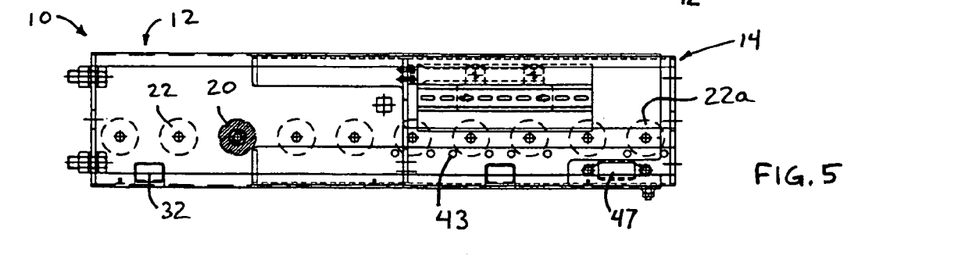
FIG. 5 is a side elevation of the adjustable conveyor bed of the present invention, showing the section in a fully retracted position.
Figure 14:
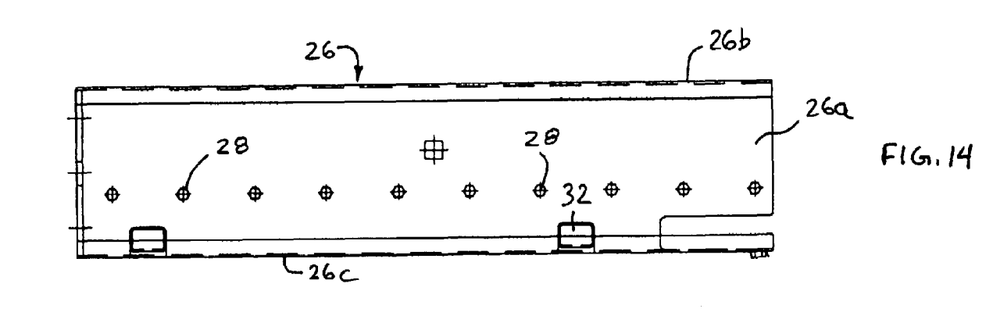
FIG. 14 is a side elevation of a channel assembly of the adjustable conveyor bed of the present invention.
Figure 15:
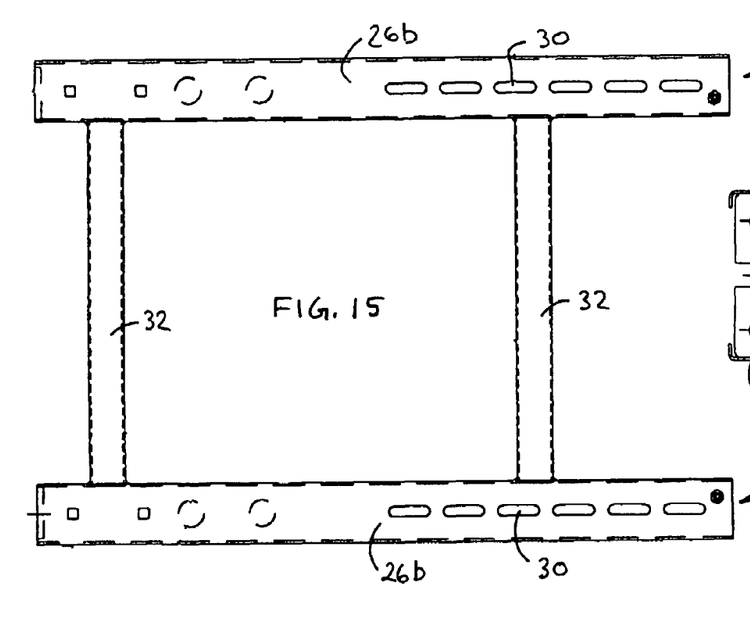
FIG. 15 is a top plan view of the channel assembly of FIG. 14.
Figure 16:
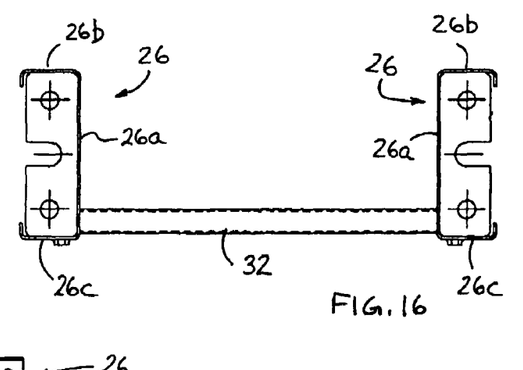
FIG. 16 is an end elevation of the channel assembly of FIGS. 14 and 15.
Figure 17:
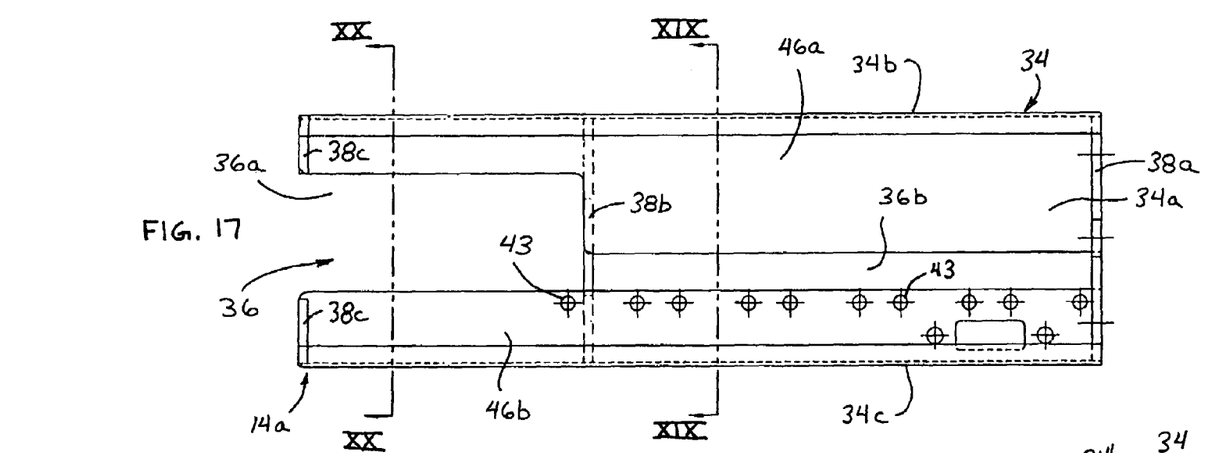
FIG. 17 is a side elevation of an inner channel member of the adjustable conveyor bed of the present invention.
Figure 18:
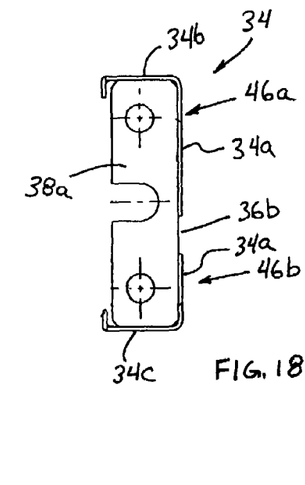
FIG. 18 is an end elevation of the inner channel member of FIG. 17.

Primary section 12 includes opposite sidewalls or side channels 26 that are fixedly mountable to a support structure or floor of a facility at which the conveyor system is installed. In the illustrated embodiment, sidewalls 26 are generally C-shaped (as can be seen in FIGS. 3 and 4) and have a generally vertical portion 26a, an upper portion 26b and a lower portion 26c. Vertical portion 26a includes a plurality of hexagonal-shaped apertures 28 (FIG. 14) for receiving the axle portions of the rollers 16 to mount the rollers to and between the sidewalls 26. However, other shaped apertures may be formed for at least partially receiving the correspondingly formed axles or axle portions of the rollers, without affecting the scope of the present invention. In the illustrated embodiment, upper and lower portions 26b, 26c of sidewalls 26 include a plurality of securing slots 30 for receiving fasteners therethrough to secure the secondary section 14 relative to the primary section 12, as discussed below. One or more cross members 32 may be provided between the sidewalls 26 to enhance the structural rigidity of the primary section 12.

Secondary section 14 includes opposite sidewalls or side channels 34 that are slidable or movably received within and along sidewalls 26. In the illustrated embodiment, sidewalls 34 are generally C-shaped (as can be seen in FIGS. 3 and 4) and have a generally vertical portion 34a, an upper portion 34b and a lower portion 34c. Vertical portion 34a includes an elongated slot 36 extending therealong (such as substantially or entirely the length of the sidewall 34). Slot 36 includes a wider slot region 36a at an inward end 14a of secondary section 14 (the end that is received in the primary section) and a narrower or reduced slot region 36b outward from wider slot region 36a (and toward an outer end 14b of secondary section 14 that extends from primary section 12 when adjustable conveyor bed is extended). In the illustrated embodiment, upper and lower portions 34b, 34c of sidewalls 34 include a plurality of securing slots 44 for receiving fasteners therethrough to secure the secondary section 14 relative to the primary section 12, as discussed below. Secondary section 14 may also include a cross member 47 that is connected to and between the sidewalls 34 to enhance the structural rigidity of the secondary section 14, particularly when it is extended or partially extended from primary section 12.

Figure 19:
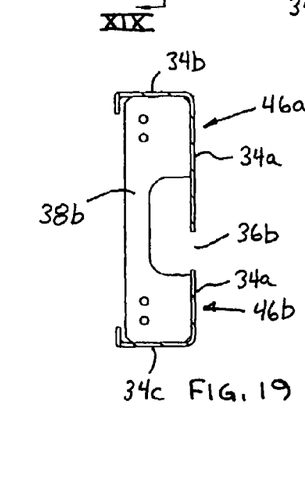
FIG. 19 is a sectional view of the inner channel member taken along the line XIX-XIX in FIG. 17.
Figure 20:
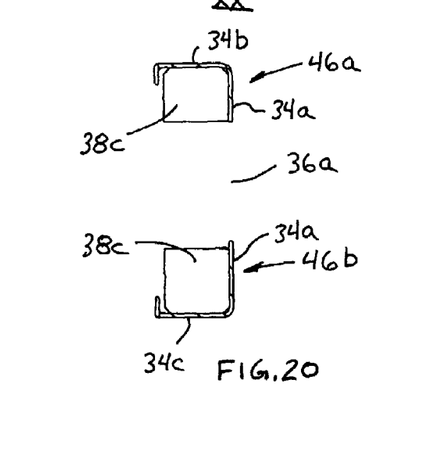
FIG. 20 is a sectional view of the inner channel member taken along the line XX-XX in FIG. 17.

In the illustrated embodiment, and as best understood with reference to FIGS. 17-20, sidewalls 34 of secondary section 14 comprise an upper portion 46a and a lower portion 46b secured together by a pair of connecting plates or members 38a, 38b, whereby slot 36 is defined between and along the spaced apart upper and lower portions 46a, 46b. Wider slot region 36a provides clearance of components (such as controls, photo-sensors, rollers and the like) mounted to the sidewalls 26 of primary section 12, while narrower slot region 36b provides clearance for the rollers 16 mounted to the sidewalls of primary section 12, when secondary section 14 is at least partially retracted. As best shown in FIG. 19, plate 38b includes a notch 39 therein to provide clearance for the axles of the primary rollers and for other components of the primary section when the secondary section is at least partially retracted so that plate 38b is positioned along and within the primary sidewall or side channel. Additional plates 38c may be provided at the upper and lower portions of the C-shaped channel to provide enhanced structural rigidity to the secondary section sidewalls 34. The plates 38c may be spaced apart to provide clearance of components along the primary section.

Figure 21:
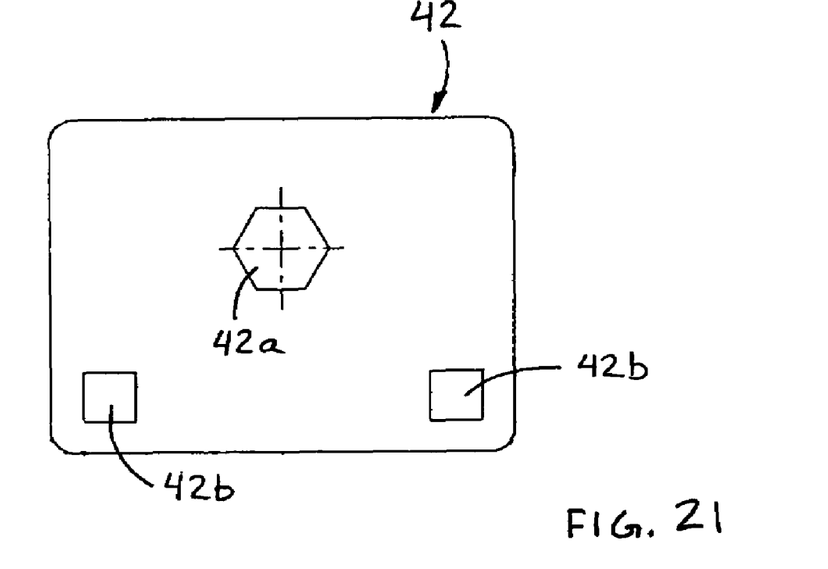
FIG. 21 is a plan view of a roller mounting bracket suitable for use with the adjustable conveyor bed of the present invention.

When secondary section 14 is extended from primary section 12, one or more rollers 40 may be mounted at and generally along narrower slot region 36b to extend the conveying surface of the adjustable conveyor bed 10. In the illustrated embodiment, a mounting plate 42 (having a hexagonal-shaped aperture 42a (FIG. 21) formed therethrough) is mounted to each sidewall 34 (such as via fasteners 43a inserted through mounting apertures 42b in mounting plate 42 and through respective mounting apertures 43 spaced along lower portions 46b of sidewalls 34) and at least partially spans the slot region 36b so as to mount a roller 40 at and between the sidewalls 34 of secondary section 14, as discussed below. Although shown and described as a hexagonal-shaped aperture, the aperture in the roller mounting plate may be any other suitable shape for receiving a correspondingly shaped axle or axle portion of a roller at least partially therethrough.

Secondary section 14 is extendable and retractable relative to first or primary section 12 via sliding of sidewalls 34 of secondary section 14 along and within sidewalls 26 of primary section 12. The adjustable conveyor bed 10 thus may be positioned between two devices of a conveyor system, such as between two spaced apart conveying zones or between two devices, such as vertical lift devices or the like, or between a conveying zone and another device, and extended/retracted/adjusted to set the length of adjustable conveyor bed 10 to span the gap between the spaced apart devices/zones to provide a substantially continuous conveying surface without having to manufacture a new zone or section to span the gap.

For example, adjustable conveyor bed 10 may be placed between two spaced apart zones or sections or devices of the conveyor system, such as with the primary section generally at or adjacent to or abutted against one of the zones or sections and devices. The secondary section 14 may be readily extended from the primary section 12 until the outer end 14b of the secondary section is generally at or adjacent to or abutted against the other of the spaced apart zones or sections or devices. If the secondary section is extended a sufficient amount from the primary section, one or more rollers 40 (such as a motorized roller 40a and/or one or more idler rollers 40b) may be readily mounted to the secondary section such that the adjustable conveyor bed provides a substantially continuous conveying surface between the spaced apart zones or sections or devices of the conveyor system. The adjustable conveyor bed of the present invention thus may be readily adapted to fit within a gap between two spaced apart zones or sections or devices and thus may accommodate or make up for size or length variations and tolerance variations of the other zones or sections or devices of the conveyor section.

When the secondary section 14 is extended a desired amount from the primary section 12, the sidewalls 34 may be secured to the sidewalls 26 via fasteners 50 extending through the slots 30, 44 at the upper portions 26b, 34b of the sidewalls and at the lower portions 26c, 34c of the sidewalls. The fasteners 50 (such as carriage bolts and corresponding female fasteners or nuts) may be tightened to substantially clamp the sidewall portions together to limit or substantially preclude unintentional extension or retraction of the secondary section relative to the primary section once the desired degree of extension of the adjustable conveyor bed is established. The fasteners 50 may be inserted through different ones of the slots depending on the degree of extension of the adjustable conveyor bed.

As can be seen with reference to FIGS. 5-12, secondary section 14 may be adjustable relative to primary section 12 between a fully retracted position (FIG. 5) and a fully extended position (FIG. 12), and may be secured relative to primary section 12 at any desired degree of extension between the fully retracted and fully extended positions (such as shown in FIGS. 6-11). As secondary section 14 is extended from primary section 12 a sufficient amount, one or more rollers 40 may be mounted to the mounting plates 42 secured to lower portions 46b of sidewalls 36 to extend the conveying surface the appropriate amount such that the conveying surface is substantially similar in length as the extended sidewalls of the adjustable conveyor bed. The apertures 43 are spaced along lower portion 46b and the slot 36b so that the mounting plates 42 and rollers 40 may be readily mounted at a desired spacing along the secondary section 14 (such as a spacing pattern substantially similar to the spacing of the apertures for receiving the roller axles along primary section 12, such as at about three inch increments or thereabouts).

Figure 6:
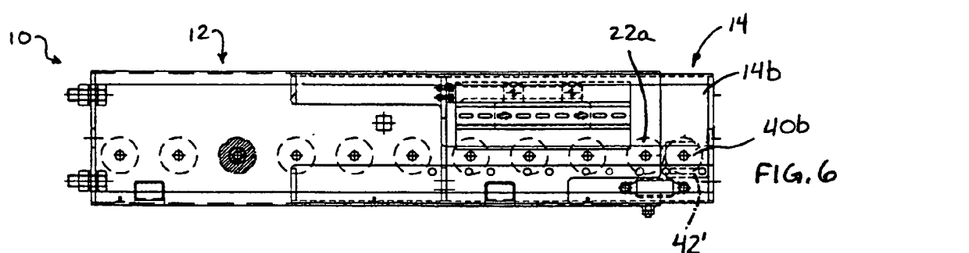
FIGS. 6-12 are side elevations of the adjustable conveyor bed of FIG. 5, showing different degrees of extension of the section.
Figure 22:
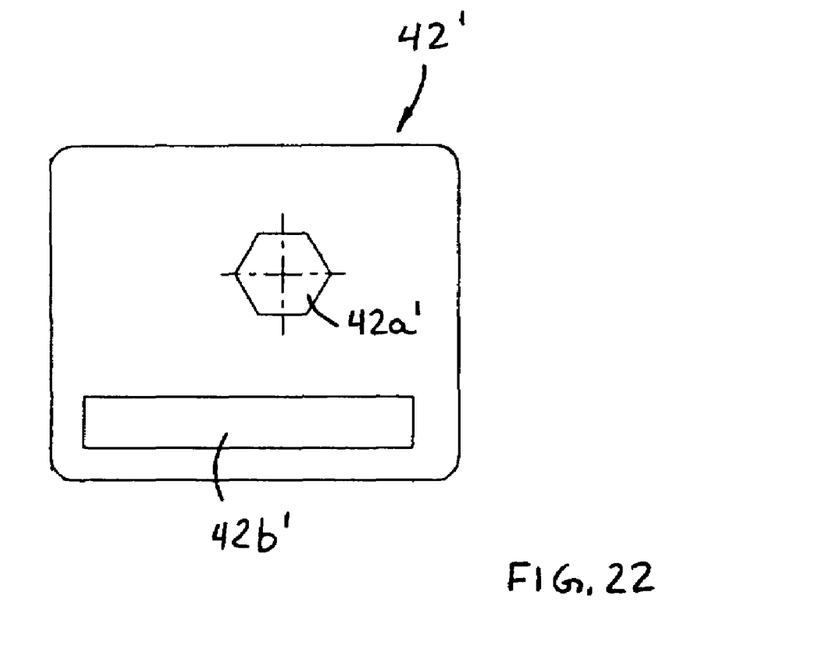
FIG. 22 is a plan view of another roller mounting bracket suitable for use with the adjustable conveyor bed of the present invention.

For example, and as shown in FIG. 6, when secondary section 14 is extended slightly (such as about one and a half to two inches or thereabouts) from primary section 12, an idler roller 40b may be mounted to the sidewalls 34 of secondary section 14 to provide a conveying surface or support at the extended end of the adjustable conveyor bed. The idler roller 40b may be mounted to a mounting plate 42', which includes a hex opening 42a' (or other suitably shaped opening for receiving a correspondingly shaped axle of a roller) and a mounting slot 42b' (FIG. 22) to allow for longitudinal adjustment of the plate 42' to position the idler roller 40b at the desired location between the end idler roller 22a of primary section 12 and the outer end 14b of secondary section 14. This allows a roller to be positioned along secondary section 14 even when secondary section 14 has not extended an amount that is sufficient to space the additional roller an amount substantially similar to the spacing of the rollers along the primary section. The idler roller 40b may function as a freely rotating roller and may rotate independently of the rollers 16 of primary section 12, or the idler roller 40b may be interconnected to the other rollers via an O-ring or the like, without affecting the scope of the present invention.

Figure 7:
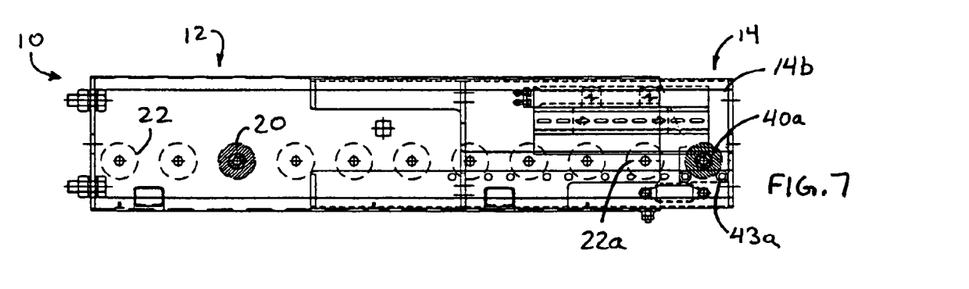
Figure 8:
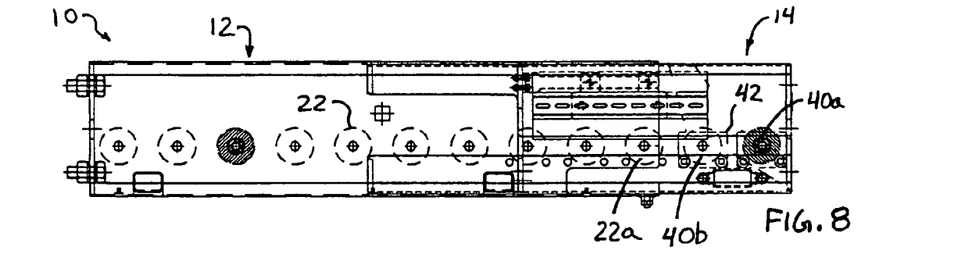

As shown in FIG. 7, if secondary section 14 is extended further (such as about three inches or thereabouts) from primary section 12, a motorized roller 40a may be mounted to the sidewalls of secondary section 14. Desirably, this roller is a motorized roller so as to provide driven conveyance of the article on the zone or bed at that end of the zone or bed, since adding additional idler rollers and interconnecting them to the primary section rollers via O-rings may result in too many rollers to be driven by the motorized roller 20 of primary section 12. Typically, and as shown in the illustrated embodiment, the motorized roller of primary section 12 may rotatably drive (such as via O-rings or the like) up to about nine idler rollers. Additional rollers, as may be required as the secondary section extends further from primary section 12, are thus preferably driven by another motorized roller mounted at the secondary section. The second motorized roller 40a may be operable in tandem with the first motorized roller 20, or may be independently operable from the first motorized roller, as discussed below. As can be seen in FIG. 7, when secondary section 14 is extended a sufficient amount for the motorized roller, the motorized roller may be mounted to the sidewalls 34 via the mounting plates 42, which are substantially fixedly attached at the respective mounting apertures 43 of the lower portion 46b of sidewalls 34 of secondary section 14.

Figure 9:
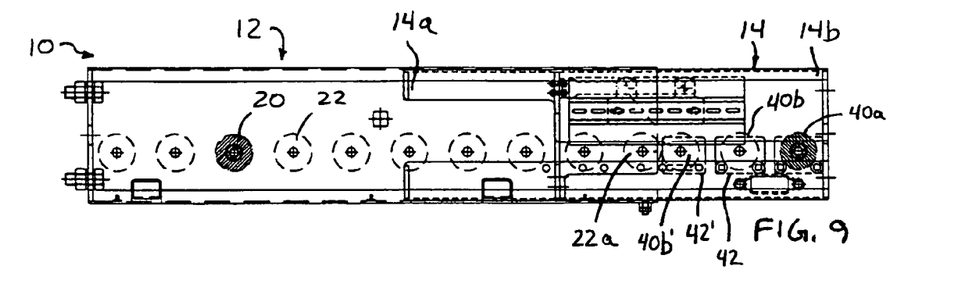
Figure 10:
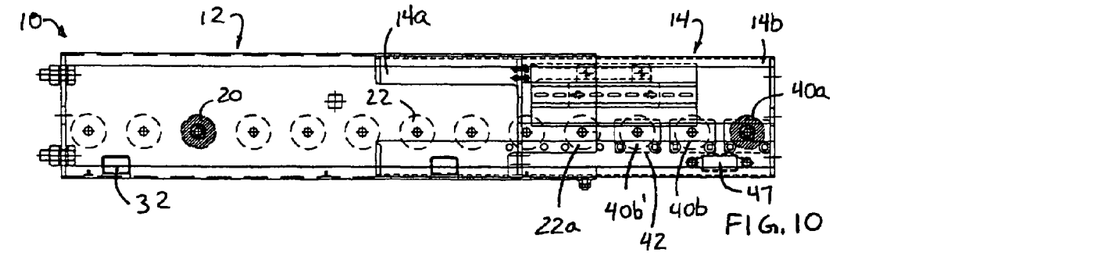
Figure 11:
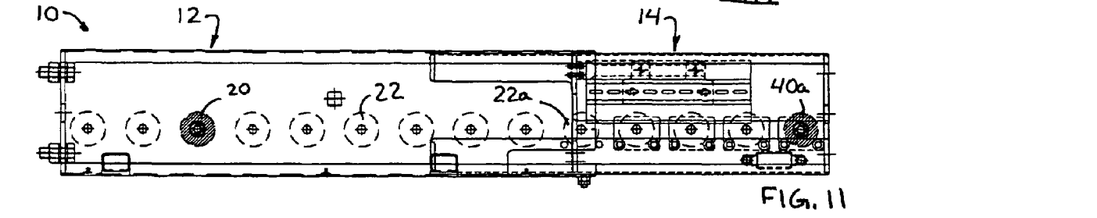
Figure 12:
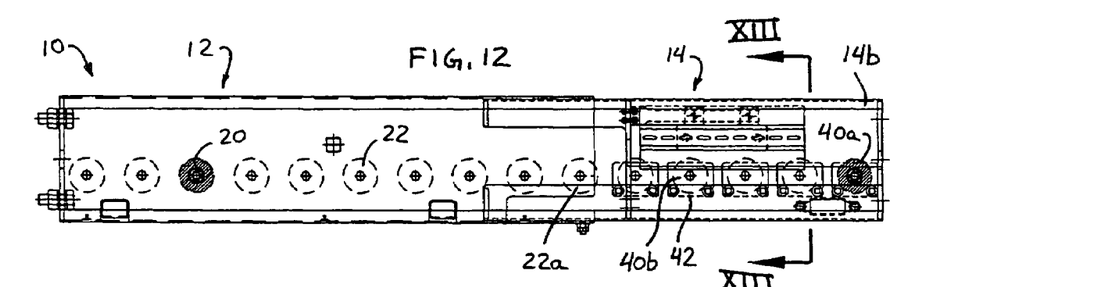
Figure 13:
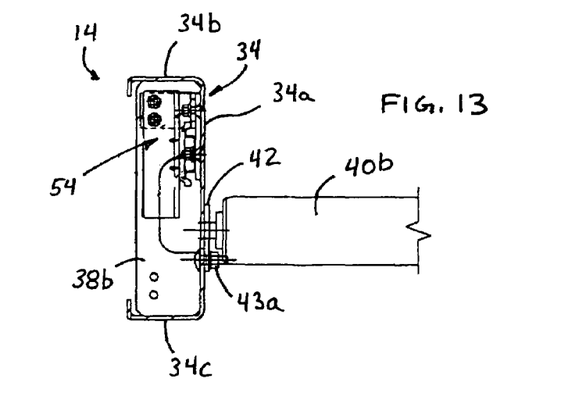
FIG. 13 is a partial sectional view of the adjustable conveyor bed taken along the line XIII-XIII in FIG. 12.

As can be seen with reference to FIGS. 8-12, as the secondary section 14 is extended further from primary section 12, additional idler rollers 40b may be added between the end motorized roller 40a and the end roller 22a of primary section 12. The idler rollers 40b may be mounted to the sidewalls 34 via mounting plates 42 and/or 42' depending on the degree of extension of secondary section 14. For example, and as shown in FIG. 9, an idler roller 40b may be mounted to secondary section 14 via mounting plates 42, while an inward idler roller 40b' may be mounted to secondary section 14 via mounting plates 42', in order to allow for longitudinal adjustment of the location of the idler roller 40b' relative to the mounting apertures 43. If secondary section 14 is extended further (as shown in FIG. 10), the inner idler roller 40b' may be mounted to the secondary section 14 at the appropriate mounting apertures via mounting plates 42, such that the inner idler roller 40b' is similarly spaced from the other idler roller 40b and the end idler roller 22a of primary section 12. The idler rollers 40b and motorized roller 40a may be drivably connected via driving members or O-rings 48 (FIG. 4) or the like.

Accordingly, the secondary or extendable section of the adjustable conveyor bed may be extended a desired or appropriate amount to accommodate a wide range in gap sizes between two spaced apart conveyor sections or zones or devices. The extendable or adjustable conveyor bed may readily mount and position one or more rollers (such as a single idler roller or a motorized roller or a plurality of rollers including a motorized roller and one or more idler rollers) along the secondary section to provide a substantially continuous conveying surface along the adjustable conveyor bed and between the spaced apart conveyors or devices. For example, if the adjustable conveyor bed is extended an amount that is a multiple of three inches, the mounting plates 42 may be used to space the rollers along the secondary section in a similar manner as the rollers are spaced along the first or primary section, while if the adjustable conveyor bed is extended other amounts, such as one and a half inches or four and a half inches or the like (or other dimensions between the three inch increments), one (or more) of the rollers may be mounted to the secondary section via the mounting plates 42', while the other rollers may be mounted to the secondary section via the mounting plates 42. The rollers mounted to the secondary section may be independent from the rollers of the primary section, and may be rotatably driven by a motorized roller of the secondary section. The motorized roller of the secondary section may be operable independently from or in tandem with the motorized roller of the first or primary section to convey articles along the adjustable conveyor bed.

It is desirable to maintain conductivity along the adjustable conveyor bed, in order to dissipate static electricity or charge on the rollers to reduce the possibility of premature failure of the motorized rollers. Thus, it is desirable to maintain conductivity between the primary section of the extendable or adjustable conveyor zone or bed and the secondary or extendable section of the adjustable conveyor bed. As shown in FIG. 1, a set screw 52 may pass through a portion of the side channel 26 of primary section 12 and may bite into the side channel 34 of secondary section 14 to break through the paint in the sidewall of the second channel to firmly contact the metal of both sections so as to conductively connect the secondary section sidewall to the primary section sidewall when the secondary section is extended to and secured at the appropriate length.

The motorized roller or rollers of the adjustable conveyor bed may comprise a self driven roller with an internal motor which is operable to rotate a roller portion relative to a shaft portion of the roller, such as a motorized roller of the types commercially available from various sources. For example, the roller may comprise a DC motorized roller, such as a 12 volt DC motorized roller or the like, such as a roller of the type disclosed in U.S. Pat. No. 6,244,427, the disclosure of which is hereby incorporated herein by reference. Optionally, the roller may comprise a 24 volt DC motorized roller or a 42 volt DC motorized roller or a 48 volt DC motorized roller or the like. For example, the motorized roller may comprise a 48 volt DC motorized roller (or a 24 volt DC motorized roller) having a diameter of approximately 50 mm and an overall width of between 500 mm and 900 mm. The 48 volt DC motorized roller may comprise a DC brushless motor and may be operable at speeds between approximately 130 rpm and 1150 rpm and may provide an output of approximately 3 Nm of torque at approximately 400 rpm and approximately 1.5 Nm of torque at approximately 1150 rpm. It is further envisioned that the motorized roller may comprise other DC powered motorized rollers, or may comprise an AC powered motorized roller, such as described in U.S. Pat. No. 5,442,248, the disclosure of which is hereby incorporated herein by reference, without affecting the scope of the present invention. The motor of the motorized roller may drive the roller directly, such as disclosed in U.S. Pat. No. 6,244,427, or may drive the roller via a gear train or the like, such as disclosed in U.S. Pat. No. 5,442,248, the disclosures of which are hereby incorporated herein by reference.

The motorized roller thus drives the O-rings which drive the roller portions of the adjacent idler rollers, which freely rotate about their shaft portions and drive the next adjacent idler rollers via respective O-rings. The idler rollers may be any type of rollers, such as conventional, freely rotating rollers, such as the types also commercially available from various sources. The rollers and sidewalls of the adjustable conveyor bed may incorporate various aspects of the conveyors described in U.S. Pat. Nos. 6,253,909; 6,899,219; 6,868,961; 6,883,660; 7,040,478; and/or 7,021,456, and/or in U.S. patent applications Ser. No. 10/710,809, filed Aug. 4, 2004 by Tasma et al. for MOTORIZED ROLLER TRANSVERSE DRIVE, now U.S. Pat. No. 7,383,935; Ser. No. 10/907,929, filed Apr. 21, 2005 by Anderson et al. for NETWORK TOPOLOGY DISCOVERY; and/or Ser. No. 10/975,913, filed Oct. 28, 2004 by Pelak et al. for FLUSH MOUNTED MOTORIZED ROLLER FOR CONVEYOR, which are all hereby incorporated herein by reference in their entireties.

The motorized roller or rollers may be mounted to the respective sections via insertion of the axle portions through the hexagonal-shaped apertures in the sidewalls, or may be secured to the sidewalls via other mounting arrangements, such as the types described in U.S. patent application Ser. No. 11/159,796, filed Jun. 23, 2005 by Cotter et al. for MOTORIZED ROLLER SHAFT MOUNT, now U.S. Pat. No. 7,243,784, and U.S. provisional applications, Ser. No. 60/585,311, filed Jul. 2, 2004 by Cotter et al. for ROLLER SHAFT MOUNT; and/or Ser. No. 60/672,888, filed Apr. 19, 2005, and/or U.S. Pat. Nos. 6,367,617 and 6,685,008, which are all hereby incorporated herein by reference in their entireties.

As shown in FIG. 1, adjustable conveyor bed 10 may also include an article sensor or photo eye or photo sensor 24 for detecting articles or packages or the like at or on the conveying surface of the respective zone. The control may independently operate the motorized rollers 20 of the adjustable conveyor bed to move the articles along adjustable conveyor bed 10 and/or to temporarily stop the movement of the article or articles to accumulate articles on adjustable conveyor bed 10 in response to the sensor 24 and depending on the particular application of the conveyor. The adjustable conveyor bed 10 and the conveyor system thus may be operable to accumulate articles on one or more of the zones of the conveyor system.

The control and the photo-eyes or article sensors 24 may be operable to accumulate articles on the zones of the roller conveyor, and may be operable to individually control operation of at least some of the zones, such as by utilizing accumulating logic and/or circuitry and the like, such as by utilizing the accumulating logic and/or principles disclosed in U.S. patent application, Ser. No. 10/605,277, filed Sep. 19, 2003 by Haan et al., for ACCUMULATING CONVEYOR SYSTEM (Attorney Docket SIE04 P-109A), which is hereby incorporated herein by reference in its entirety. Article sensors 24 may be of the type disclosed in U.S. Pat. Nos. 5,582,286 and 6,253,909, and/or U.S. patent application, Ser. No. 10/605,277, filed Sep. 19, 2003 by Haan et al., for ACCUMULATING CONVEYOR SYSTEM (Attorney Docket SIE04 P-109A), which are hereby incorporated herein by reference in their entireties.

The article sensor may comprise a photo sensor positioned at or near a downstream end of the adjustable conveyor bed and operable to detect products or articles as they move along the adjustable conveyor bed. The motorized or driven rollers of the adjustable conveyor bed and of another zone or zones of the conveyor system may be selectively activated or deactivated by the control in response to a corresponding article sensor, or in response to more than one of the article sensors positioned along the conveyor system, to move or stop an article or articles that is/are present on the respective zones or sections or beds. The motorized rollers thus may be directly driven and operable to selectively and independently convey or accumulate one or more articles on the adjustable conveyor bed and any other associated conveyor zones in response to one or more of the article sensors.

The conveyor system thus may include a controller or control that is operable to control the internal motor of the motorized roller or rollers of the zone or zones to convey articles along the zone or zones at the desired or appropriate or selected speed. The control may activate and deactivate the motor or motors to convey articles and may adjust the rotational speed of the motorized roller or rollers to adjust the speed of conveyance along the zone or zones. The control may be any type of controller element or circuitry, such as an ICC type controller or the like.

Optionally, the control may be mounted on one of the sidewalls 34 of secondary section 14 and connected to the motorized roller 20 and another motorized roller 40a of the adjustable conveyor bed if such a roller is installed at the secondary section. In such an application, secondary section 14 may include a mounting bracket 54 secured to one of the sidewalls (such as to the support plate 38b of one of the sidewalls 34) for attaching a controller to the adjustable conveyor bed. The controller or control panel may be snapped onto the bracket 54 or secured thereto via fasteners or the like, without affecting the scope of the present invention. Mounting the controller to the adjustable conveyor zone or bed allows the zone or bed to be implemented at a conveyor system without having to be tied to or connected to other conveyor zones or sections, such as when the adjustable conveyor zone or bed is placed between two devices, such as vertical lift units or the like.

By positioning the controller on the bracket 54 of secondary or extendable section 14, the controller may readily connect to the motorized roller 40a and move with the motorized roller 40a so that additional length wires or connectors are not needed between the controller and motorized roller 40a as the adjustable conveyor bed is extended. The controller may control the motors of the motorized rollers 20 and 40a in tandem, and may control the motors in response to the photo sensor 24 of the adjustable conveyor bed. The controller may be connected to or in communication with other controllers of the conveyor system or a main control of the conveyor system, such that the controller controls the motors of the motorized rollers in a similar manner as the other rollers of the conveyor system.

Optionally, the motorized rollers 20, 40a of the adjustable conveyor bed 10 may be controlled via a control or controller that is remote from the adjustable conveyor bed 10. For example, a control of another zone or a control of the conveyor system may be mounted or positioned along the conveyor system and remote from adjustable conveyor bed 10, and may be connected to the motors of the motorized rollers of adjustable conveyor bed 10 (such as via wires or electrical connectors and/or the like) and to the motors of other motorized rollers of other zones of the conveyor system so as to selectively activate and deactivate and control the motors of the motorized rollers of the adjustable conveyor bed and the other zones. The remotely positioned controller may control the motorized rollers of the adjustable conveyor bed in response to the photo sensor 24 at the adjustable conveyor bed while controlling the motorized rollers of the other zones in response to respective photo sensors at those zones, or the controller may control the motorized rollers of the adjustable conveyor bed in conjunction with or in tandem with other motorized rollers along the conveyor system.

The control (either mounted to the adjustable conveyor bed or located remotely from the adjustable conveyor bed) thus may be operable to control the motorized rollers of the adjustable conveyor bed to convey articles along the adjustable conveyor bed and to accumulate articles on the adjustable conveyor bed. In applications where the adjustable conveyor bed is located at or between one or more zones of an accumulating roller conveyor system, it is desirable that the speeds of the conveyor zones be set so that articles being conveyed along the zones takes approximately the same time to travel along each of the zones. Thus, it is desirable that the control be operable to adjust or regulate the speed of the motorized roller or rollers of the adjustable conveyor bed according to the speed of the rollers of the other zones and according to the set length of the adjustable conveyor bed. This allows each zone of the conveyor system to convey articles across the zones at a given rate, such as, for example, thirty articles per minute across or along each of the zones and the adjustable conveyor bed, regardless of the length of the zones and the adjustable conveyor bed.

For example, if the adjustable conveyor bed is extended to span a gap between two zones of an accumulating conveyor system, the speed of the rollers is increased accordingly, such that the time it takes an article to travel the length of the extended zone or bed is approximately the same as the time it takes the article to travel the length of the other zone or zones of the conveyor system. Thus, if the length of the adjustable conveyor bed is increased to span between two zones (so that it is longer than the length of each of the zones), the speed of the motorized roller of the adjustable conveyor bed may be increased accordingly (such as by a similar percentage increase as that made to the length of the bed). The adjustable conveyor bed thus may be extended to any desired or appropriate or suitable length and may be operable to convey articles therealong in a manner that substantially matches the other zones of the conveyor system. The speed may be regulated and determined based on a selected base speed (such as a speed that is desired if the adjustable conveyor bed is fully retracted), and then may be increased an appropriate amount depending on the degree of extension of the adjustable conveyor bed. Thus, regardless of the degree of extension of the adjustable conveyor bed, the speed or rate or throughput of the bed (or the overall time it takes an article or articles to travel along the bed) substantially matches the speed or rate or throughput of the zone or zones (or the overall time it takes an article or articles to travel along the zone or zones).

Therefore, the present invention provides an extendable or adjustable length conveyor bed that is positionable between two spaced apart devices or zones or sections of a conveyor system and that is extendable to set the length of the bed to substantially span a gap between the devices or zones or sections. The adjustable conveyor bed may support additional rollers when the bed is extended a sufficient amount such that the primary rollers of the bed and the additional rollers define a substantially continuous conveying surface between the spaced apart devices or zones or sections. The adjustable conveyor bed of the present invention thus may be readily adapted to fit within various length gaps without significant labor and/or costs that are often associated with modifying standard length roller conveyor beds to span different length gaps. Additionally, the motorized roller or rollers of the adjustable conveyor bed may be controlled or regulated to drive the rollers at a desired or appropriate speed, which may be dependent on the speed of other zones of the conveyor system and the adjusted length of the adjustable conveyor bed. The control for controlling the motorized roller may be mounted at the adjustable conveyor bed or may be positioned or located remote from the adjustable conveyor bed depending on the particular application of the adjustable conveyor bed.

Changes and modifications in the specifically described embodiments may be carried out without departing from the principles of the present invention, which is intended to be limited only by the scope of the appended claims, as interpreted according to the principles of patent law.

The embodiments of the present invention in which an exclusive property or privilege is claimed are defined as follows:

1. An adjustable conveyor bed that is adjustable in length to span a particular gap between two devices of a conveyor system, said adjustable conveyor bed comprising:
    a primary section having opposite primary sidewalls and a plurality of primary rollers mounted thereto, said primary rollers including a primary motorized roller and a plurality of primary idler rollers interconnected with one another via a plurality of drive members, said primary rollers being substantially not movable longitudinally alone said primary sidewalls; and
    a secondary section having opposite secondary sidewalls, said secondary section sidewalls being nestedly received within said primary sidewalls and being adjustably mounted to said primary sidewalls and extendable and retractable relative to said primary sidewalls to adjust a length of said adjustable conveyor bed, said secondary section being configured to support at least one secondary roller when extended a sufficient amount from said primary section, each of said secondary sidewalls having an elongated roller slot extending at least partially therealong for positioning an axle of said secondary roller, said roller slot providing clearance of said primary rollers when said secondary section is at least partially retracted, said at least one secondary roller being mounted to mounting plates attached to said secondary sidewalls and spanning said elongated roller slots when said secondary section is at least partially extended, said at least one secondary roller being substantially not movable longitudinally along said secondary sidewalls when said at least one secondary roller is mounted to said mounting plates, said secondary sidewalls being securable to said primary sidewalls when said secondary section is extended a selected amount from said primary section.

2. The adjustable conveyor bed of claim 1, wherein one of said at least one secondary roller comprises a secondary motorized roller of said adjustable conveyor bed, said secondary motorized roller being operable in tandem with said primary motorized roller.

3. The adjustable conveyor bed of claim 1, wherein said at least one secondary roller includes at least one idler roller.

4. The adjustable conveyor bed of claim 1, wherein said opposite primary sidewalls comprise generally C-shaped channels and said opposite secondary sidewalls comprise generally C-shaped channels, said secondary sidewalls being nested within said primary sidewalls and slidable relative thereto to adjust the length of said adjustable conveyor bed.

5. The adjustable conveyor bed of claim 4, wherein said secondary sidewalls include a plurality of securing slots along a portion thereof, and said primary sidewalls include a plurality of securing slots along a portions thereof, said secondary sidewalls being securable relative to said primary sidewalls via a plurality of fasteners through said securing slots of said primary and secondary sidewalls.

6. The adjustable conveyor bed of claim 1 including a control that is operable to control said primary motorized roller, said control being mounted to one of said secondary sidewalls.

7. The adjustable conveyor bed of claim 1, wherein at least one of said two devices of said conveyor system comprises another zone of said conveyor system.

8. The adjustable conveyor bed of claim 7, wherein said primary motorized roller is connectable to a control that is remote from said adjustable conveyor bed such that said primary motorized roller is controllable in connection with motorized rollers of other zones of said conveyor system.

9. The adjustable conveyor bed of claim 1, wherein said adjustable conveyor bed is operable in response to a control, said control selectively controlling a speed of travel of an article along said adjustable conveyor bed in response to the length of said adjustable conveyor bed.

10. An adjustable conveyor bed that is adapted to span a gap between two spaced apart devices of a conveyor system, said adjustable conveyor bed comprising:

a primary section having opposite primary sidewalls and a plurality of primary rollers mounted thereto, said primary rollers including a primary motorized roller and a plurality of primary idler rollers interconnected with one another via a plurality of drive members; and a secondary section having opposite secondary sidewalls, said secondary section sidewalls being adjustably mounted to said primary sidewalls and extendable and retractable relative to said primary sidewalls to adjust a length of said adjustable conveyor bed, said secondary section being configured to support at least one secondary roller when extended a sufficient amount from said primary section, said motorized roller being operable at a selected speed, said selected speed being dependent on an overall length of said adjustable. conveyor bed, said secondary sidewalls being securable to said primary sidewalls when said secondary section is extended a selected amount from said primary section.

11. The adjustable conveyor bed of claim 10, wherein said selected speed is selected so that a time it takes for an article to travel the length of said adjustable conveyor bed is substantially similar to the time it takes an article to travel a length of other conveyor beds of said conveyor system.

12. The adjustable conveyor bed of claim 10, wherein said motorized roller of said adjustable conveyor bed is selectively operable in response to one of a control mounted to said adjustable conveyor bed and a control remote from said adjustable conveyor bed.

13. The adjustable conveyor bed of claim 10, wherein each of said secondary sidewalls has an elongated roller slot extending at least partially therealong for positioning the axle of said secondary roller, said roller slot providing clearance of said primary rollers when said secondary section is at least partially retracted, said at least one secondary roller being mounted to mounting plates attached to said secondary sidewalls and spanning said elongated roller slots when said secondary section is at least partially extended.

14. The adjustable conveyor bed of claim 10, wherein one of said at least one secondary roller comprises a secondary motorized roller of said adjustable conveyor bed.

15. The adjustable conveyor bed of claim 14, wherein said secondary motorized roller is operable in tandem with said primary motorized roller.

16. The adjustable conveyor bed of claim 10, wherein said at least one secondary roller includes at least one idler roller.

17. An adjustable conveyor bed that is adapted to span a gap between two spaced apart devices of a conveyor system, said adjustable conveyor bed comprising:

a primary section having opposite primary sidewalls and a plurality of primary rollers mounted thereto, said primary rollers including a primary motorized roller and a plurality of primary idler rollers interconnected with one another via a plurality of drive members, said primary rollers being substantially not movable longitudinally along said primary sidewalls; and a secondary section having opposite secondary sidewalls, said secondary section sidewalls being adjustabry mounted to said primary sidewalls and extendable and retractable relative to said primary sidewalls to adjust a length of said adjustable conveyor bed, said secondary section being configured to support at least one secondary roller when extended a sufficient amount from said primary section, wherein each of said secondary sidewalls has an elongated roller slot extending at least partially therealong for positioning the axle of said secondary roller, said roller slots providing clearance of said primary rollers when said secondary section is at least partially retracted, said at least one secondary roller being mounted to said secondary sidewalls at at least one selected location along said elongated roller slots when said secondary section is at least partially extended, said at least one secondary roller being substantially not movable longitudinally along said secondary sidewalls when said at least one secondary roller is supported by said secondary section; and said motorized roller of said adjustable conveyor bed being selectively operable in response to a control that is one of mounted to said adjustable conveyor bed and remote from said adjustable conveyor bed, said control being selectively positioned at or remote from said adjustable conveyor bed depending on an application of said adjustable conveyor bed, said secondary sidewalls being securable to said primary sidewalls when said secondary section is extended a selected amount from said primary section.

18. The adjustable conveyor bed of claim 17, wherein one of said at least one secondary roller comprises a secondary motorized roller of said adjustable conveyor bed, said secondary motorized roller is operable in tandem with said primary motorized roller.

19. The adjustable conveyor bed of claim 17, wherein said at least one secondary roller includes at least one idler roller.

20. The adjustable conveyor bed of claim 17, wherein said control is mounted to said adjustable conveyor bed.

21. The adjustable conveyor bed of claim 20, wherein said at least one secondary roller includes a secondary motorized roller, said control being mounted on said secondary section and connected to said secondary motorized roller.

22. The adjustable conveyor bed of claim 17, wherein said control is remote from said adjustable conveyor bed such that said primary motorized roller is controllable in connection with motorized rollers of other zones of said conveyor system.

23. The adjustable conveyor bed of claim 17, wherein said adjustable conveyor bed is selectively controlled to control a speed of travel of an article along said adjustable conveyor bed in response to the length of said adjustable conveyor bed.

24. The adjustable conveyor bed of claim 17, wherein said at least one secondary roller is mounted to mounting plates attached to said secondary sidewalls and spanning said elongated roller slots when said secondary section is at least partially extended.

* * * * *